(12) United States Patent
Miche et al.

(10) Patent No.: US 8,458,315 B2
(45) Date of Patent: Jun. 4, 2013

(54) IN-VEHICLE APPLICATION PLATFORM FOR VEHICLE-TO-BUSINESS COMMUNICATION

(75) Inventors: Markus Miche, Zurich (CH); Oliver Baecker, St. Gallen (CH); Tobias Bauer, Sinsheim (DE); Dominik Weiler, Kuppenheim (DE); Thomas Michael Bohnert, Zurich (CH)

(73) Assignee: SAP AG, Walldorf (DE)

( * ) Notice: Subject to any disclaimer, the term of this patent is extended or adjusted under 35 U.S.C. 154(b) by 283 days.

(21) Appl. No.: 12/961,300

(22) Filed: Dec. 6, 2010

(65) Prior Publication Data

US 2012/0143977 A1 Jun. 7, 2012

(51) Int. Cl.
*G06F 15/173* (2006.01)

(52) U.S. Cl.
USPC ........... 709/223; 709/203; 709/217; 709/224; 701/1; 701/22

(58) Field of Classification Search
USPC .............. 709/223, 224, 203, 217, 219; 701/1, 701/22, 23, 29, 33, 35
See application file for complete search history.

(56) References Cited

U.S. PATENT DOCUMENTS

| | | | |
|---|---|---|---|
| 6,185,491 B1 * | 2/2001 | Gray et al. ........................ 701/36 |
| 6,330,417 B1 * | 12/2001 | Behe et al. ..................... 399/286 |
| 6,377,860 B1 * | 4/2002 | Gray et al. ........................ 700/83 |
| 6,429,773 B1 * | 8/2002 | Schuyler ..................... 340/425.5 |
| 6,791,581 B2 * | 9/2004 | Novak et al. .................. 715/744 |
| 6,954,799 B2 * | 10/2005 | Lerner ........................... 709/240 |
| 7,289,020 B2 * | 10/2007 | Larson et al. ................. 340/438 |
| 7,382,289 B2 | 6/2008 | McCarthy et al. |
| 7,756,963 B2 * | 7/2010 | Ellis et al. ...................... 709/223 |
| 7,865,613 B2 * | 1/2011 | Lerner ........................... 709/240 |
| 2003/0107588 A1 * | 6/2003 | Elsbree et al. ................. 345/700 |
| 2003/0120397 A1 * | 6/2003 | Bergmann et al. ................. 701/1 |
| 2003/0220725 A1 * | 11/2003 | Harter et al. ..................... 701/36 |
| 2004/0034455 A1 * | 2/2004 | Simonds et al. .................. 701/1 |
| 2004/0056890 A1 * | 3/2004 | Hao et al. ....................... 345/744 |
| 2005/0060070 A1 * | 3/2005 | Kapolka et al. ................. 701/29 |

(Continued)

FOREIGN PATENT DOCUMENTS

GB 2460923 A 12/2009

OTHER PUBLICATIONS

Fetiha Ben Cheikh, et al., "Implementing a Real-Time Middleware Based on DDS for the Cooperative Vehicle Infrastructure Systems," Sep. 20, 2010, Wireless and Mobile Communications (ICWMC) 2010 6th International Conference on IEEE, pp. 492-497, 2010 IEEE.

(Continued)

*Primary Examiner* — Lashonda Jacobs
(74) *Attorney, Agent, or Firm* — Fountainhead Law Group PC

(57) ABSTRACT

Embodiments of the present invention include systems and methods for a computer-implemented, in-vehicle application platform (VAP) for conducting vehicle-to-business (V2B) communication. A V2B vehicle application layer resides within the vehicle. The VAP comprises a communication layer facilitating reliable message exchange between this vehicle application layer and V2B business applications. The VAP further comprises a HW abstraction layer encapsulating vehicle-specific interfaces both with regard to the CAN bus and the in-vehicle HMI. According to certain embodiments, these layers of the VAP provide their functionality via open, non-proprietary, and well-defined interfaces, allowing for efficient development of V2B applications and enhancing portability of the latter.

17 Claims, 9 Drawing Sheets

U.S. PATENT DOCUMENTS

| | | | |
|---|---|---|---|
| 2005/0155035 A1* | 7/2005 | Branigan et al. | 719/310 |
| 2006/0271246 A1* | 11/2006 | Bell et al. | 701/1 |
| 2007/0294625 A1* | 12/2007 | Rasin et al. | 715/748 |
| 2008/0147692 A1* | 6/2008 | Hovey et al. | 707/101 |
| 2009/0006870 A1* | 1/2009 | Duri et al. | 713/193 |
| 2009/0172117 A1* | 7/2009 | Bedi et al. | 709/206 |
| 2011/0225259 A1* | 9/2011 | Quinn et al. | 709/217 |
| 2012/0071140 A1* | 3/2012 | Oesterling et al. | 455/414.1 |
| 2012/0272252 A1* | 10/2012 | Beardsmore et al. | 719/328 |
| 2012/0290656 A1* | 11/2012 | Jellard | 709/204 |

OTHER PUBLICATIONS

Luigi Liquori, et al., "An Overlay Architecture for Vehicular Networks," Networking 2008 Ad Hoc and sensor Networks, Wireless Networks, Next Generation Internet; May 5, 2008, pp. 60-71.

Tomatis A, et al., "A Test Architecture for V-2-X Cooperative Systems Field Operational Tests," 2009 9th International Conference on its Telecommunications (ITST 2009), Oct. 20, 2009, pp. 616-621, 2009 IEEE.

Partial European Search Report (from a corresponding foreign application) EP 11009444, mailed Feb. 14, 2012.

Extended European Search Report (from a corresponding foreign application) EP 11009444 mailed Apr. 30, 2012.

S. Andrews and M. Cops, Final Report: Vehicle Infrastructure Integration Proof of Concept Technical Description—Vehicle. The VII Consortium, May 19, 2009, Research and Innovation Technology Administration, US Department of Transportation.

O. Baecker, F. Michahelles, A. Bereuter, D. Mollnau, F. Geller and E. Fleisch, "Mobile First Notice of Loss: Claim Assistance in your Pocket." In Proceedings of the 7th International Conference on Pervasive Computing (pp. 279-292). Vienna, Austria. 2009.

Vlad Coroama and Marc Langheinrich, "Personalized Vehicle Insurance Rates—A Case for Client-Side Personalization in Ubiquitous Computing." In Workshop on Privacy-Enhanced Personalization at CHI 2006, pp. 1-4. Institute for Pervasive Computing. 2006.

K. Farkas, J. Heidemann, L. Iftode, T. Kosch, M. Strassberger, et al., "Vehicular Communication." IEEE Pervasive Computing, 5(4), pp. 55-62. doi 10.11091MPRV. 2006.

P. Gustafson, S. Doncheva, H.U. Michel, F. Wildschuette, J. Wojatchek; V. Vieroth, and E. Vermassen, GST Open Systems Architecture and Interface Specification. Sep. 2005.

Yi Huang and Dennis Gannon, "A Comparative Study of Web Services-Based Event Notification Specifications." In ICPPW '06: Proceedings of the 2006 International Conference Workshops on Parallel Processing (pp. 7-14). Washington DC., IEEE Computer Society. 2006.

Daniel Jiang and Luca Delgrossi, "IEEE 802.11p: Towards an International Standard for Wireless Access in Vehicular Environments." In Proc. of IEEE Vehicular Technology Conference (VTC) Spring, pp. 2036-2040. 2008.

Holger Kussmann et al., "System Architecture, Data Flow Protocol Definition and Design and AIDE Specifications." Information Society Technologies (IST) Programme. Mar. 2004.

Andreas Luebke, "Car-to-Car Communication—Technologische Herausforderungen." In Kongressband zum VDE—Kongress 2004-Innovationen. 2004.

Kirsten Matheus, Rolf Morich, and Andreas Luebke, "Economic Background of Car-to-Car Communication." In Proceedings of the 2. Braunschweiger Symposium Informationssysteme fur Mobile Anwendungen (IMA 2004). 2004.

Friedemann Matter and Christian Floerkemeier, "Vom Internet der Computer zum Internet der Dinge." Informatik-Spektrum, 33(2). 2010.

Markus Miche and Thomas Michael Bohnert, "The Internet of Vehicles or the Second Generation of Telematic Services." ERCIM News 77,pp. 43-45. Apr. 2009.

M. Ott, H. Gretzinger et al., "Erhoehte Sehschaerfe: Technologiebasierte Innovationen in der Versicherungswirtschaft: Bedeutung, Chancen und Herausforderungen." Accenture Studie. 2008.

Arnor Solberg et al., "Architecture and System Specifications." CVIS Cooperative Vehicle-Infrastructure Systems, Jul. 2007.

Callum Stuart et al., "Integration of Nomadic Devices: The AIDE Use Case." Information Society Technologies (IST) Programme. Mar. 2004.

L. de Souza et al., "Socrades: A Web Service Based Shop Floor Integration Infrastructure." In the Internet of Things, vol. 4952, pp. 50-67. Springer. 2008.

E. Aitenbichler et al., "MundoCore: A Light-Weight Infrastructure for Pervasive Computing." Pervasive and Mobile Coputing doi: 10.1016/j.pmcj.2007.04.002, published by Elsevier B.V. vol. 3, pp. 332, 361. 2007.

Oliver Baecker et al., "Vehicle-to-Business Communication: The Example of Claims Assistance in Motor Insurance." Automotive Services, pp. 899-910. 2010.

Marc Brogle, Evgeny Osipov, Torsten Braun, and Geert Heijenk, Fourth ERCIM Workshop on EMobility. Lulea University of Technology, Lulea, Sweden, May 31, 2010.

OASIS Web Services Base Notification 1.3 (WS-BaseNotification). OASIS Open. Oct. 1, 2006.

OASIS Web Services Brokered Notification 1.3 (WS-BrokeredNotification). OASIS Open. Oct. 1, 2006.

OASIS Web Services Topics 1.3 (WS-Topics). OASIS Open. Oct. 1, 2006.

OASIS Web Services: SOAP Message Security 1.1 (WS-Security 2004). OASIS Open. Feb. 1, 2006.

Pre-Drive C2X, Deliverable D1.4—Refined Architecture, Version 1.2, Aug. 2009. 7th Framework Programme, Information and Communication Technologies.

* cited by examiner

IN-VEHICLE APPLICATION PLATFORM FOR VEHICLE-TO-BUSINESS COMMUNICATION

BACKGROUND

The present invention relates to computing, and in particular, to a systems and methods for a computer implemented, in-vehicle application platform for conducting Vehicle-to-Business communication.

Unless otherwise indicated herein, the approaches described in this section are not prior art to the claims in this application and are not admitted to be prior art by inclusion in this section.

Efforts are currently being directed to developing dedicated communication concepts and architectures for vehicular communications. Such vehicular communications could allow market introduction of cooperative Intelligent Transport Systems (ITS).

Development activities focus on information exchange among vehicles (vehicle-to-vehicle communication (V2V)), and between vehicles and their surrounding roadside infrastructure such as traffic lights or roadwork warning signs (vehicle-to-infrastructure communication (V2I)). A general description of vehicular communication is provided in the following document, which is incorporated by reference herein in its entirety for all purposes: Farkas et al., "Vehicular Communication", IEEE Pervasive Computing, 5(4), 55-62. doi: 10.1109/MPRV.2006.90 (2006).

By facilitating information exchange, V2V and V2I communication may enhance road safety and traffic efficiency. Research activities in PRE-DRIVE C2X, CVIS, or simTD, to name a few, provide proof-of-concept prototypes to evaluate the underlying communication concepts, and assess the actual impact on road safety and traffic efficiency in field operational tests.

The eventual introduction of V2V and V2I technologies faces certain challenges because they are subject to large network effects. For example, the connection and interaction of vehicles with other vehicles and with roadside infrastructure is based on the IEEE standard 802.11p, which is meant for coping with the high mobility of vehicles and the resulting frequency of changes in network topology. This standard is discussed in the following document, which is incorporated by reference herein in its entirety for all purposes: Jiang & Delgrossi, "IEEE 802.11 p: Towards an international standard for wireless access in vehicular environments", Proc. of IEEE Vehicular Technology Conference (VTC), pp. 2036-2040 (Spring 2008).

However due to the relatively short range (roughly 500 m coverage) of this wireless technology, a certain penetration is needed to achieve certain objectives in scenarios such as accident or traffic jam ahead warning. This is described by Matheus, Morich, & Lübke, in "Economic Background of Car-to-Car Communication", Proc. of the 2. Braunschweiger Symposium Informationssysteme für mobile Anwendungen, Braunschweig, Germany (IMA 2004), which is incorporated by reference in its entirety herein for all purposes.

In recent years the proliferation of Broadband Wireless Access (BWA) technologies, such as UMTS/HSPA, WiMAX, or LTE, has provided the foundation for a third pillar of ITS: the integration of vehicles and business applications (Vehicle-to-Business communication (V2B)). V2B facilitates possible application to multiple domains, including but not limited to fleet management, logistics, or car insurance. Application of V2B to car insurance is described by Coroama & Langheinrich in "Personalized Vehicle Insurance Rates—A Case for Client-Side Personalization in Ubiquitous Computing", Workshop on Privacy-Enhanced Personalization, Montreal, Canada, pp. 1-4, CHI (2006), which is incorporated by reference in its entirety herein for all purposes.

As the interconnection of vehicles and business applications is related to the vision of the Internet of Things (IoT) and related research activities, V2B can build upon the existing mature integration architectures of the IoT. The following documents describing such research are incorporated by reference in their its entireties herein for all purposes: Mattern & Floerkemeier, "Vom Internet der Computer zum Internet der Dinge", Informatik-Spektrum, 33(2) (2010); and de Souza et al., "Socrades: A web service based shop floor integration infrastructure", in The Internet of Things, Vol. 4952, pp. 50-67 (2008).

FIG. 1 shows an overall simplified view of an example of one ITS 100, illustrating V2V communication 102 between vehicles 103, V2I communication 104 between vehicles 103 and infrastructure 105, and V2B communication 106 between vehicles 103 and business applications 108.

An in-vehicle V2B communication system can be deployed on an extended On-Board Unit (OBU) that supports both protocol stacks for V2B and V2V/V2I, respectively. V2B communication does not depend on the number of vehicles being equipped with the communication system. Hence V2B communication fosters the introduction of V2V and V2I technologies, thereby aiding in V2V and V2I communication.

V2B communication faces at least two possible major challenges. One is the heterogeneity of in-vehicle hardware and software components. In particular, the components utilized by different vehicle manufactures, and even in different product lines of the same manufacturer, may call for significant adaptations to V2B vehicle applications for different manufacturers or product lines.

For example, in-vehicle Human Machine Interfaces (HMI) often provide varying input modalities, screen resolutions, and color sets between vehicles of different manufacturers, or even between different product lines. Furthermore, the interface of the Controller Area Network (CAN) bus used for accessing vehicle data (such as current mileage or the oil level) is often specific to the vehicle manufacturer/product line, and may necessitate respective adaptations. Despite the promising opportunities of V2B communication, the high development costs caused by this heterogeneity may pose a burden, and might hinder an early adoption of this new technology.

A second potential challenge faced by V2B applications is the intermittent connectivity of vehicles, as affected by their high mobility. This mobility, coupled with the incomplete network coverage of existing BWA technologies point out the need for an in-vehicle communication concept that enables a reliable information exchange between vehicles and business applications.

The present disclosure addresses these and other issues with systems and methods for a computer implemented, in-vehicle application platform for conducting V2B communication.

SUMMARY

Embodiments of the present invention include systems and methods for a computer-implemented, in-vehicle application platform (VAP) for conducting vehicle-to-business (V2B) communication. An V2B vehicle application layer resides within the vehicle. The VAP comprises a communication layer facilitating reliable message exchange between this vehicle application layer and V2B business applications. The VAP further comprises a HW abstraction layer encapsulating vehicle-specific interfaces both with regard to the CAN bus and the in-vehicle HMI. According to certain embodiments, these layers of the VAP provide their functionality via open, non-proprietary, and well-defined interfaces, allowing for efficient development of V2B applications and enhancing portability of the latter.

A computer-implemented method according to an embodiment of the present invention comprises, placing a vehicle-to-business software application present within a vehicle, into publish/subscribe communication with a service provider through a message broker of a vehicle application platform also present within the vehicle. The message broker is caused to buffer messages to be delivered to the service provider that cannot be delivered due to a temporary communication disconnection between the vehicle and the service provider.

In certain embodiments, the method further comprises causing the message broker to reschedule delivery of messages to the service provider.

In certain embodiments, the method further comprises causing the message broker to assign a priority to messages to the service provider.

In certain embodiments, the assignment of the priority is based upon a certificate assigned to the vehicle-to-business software application.

In certain embodiments, the method further comprises causing the message broker to deliver messages to a business application based upon the assigned priority.

In certain embodiments, the method further comprises causing the message broker to invoke the vehicle-to-business software application based upon a message header extended by a pre-defined set of metadata.

An embodiment of a non-transitory computer readable storage medium according to the present invention, embodies a computer program for performing methods according to various embodiments described above.

An embodiment of a computer system according to the present invention comprises, one or more processors, and a software program, executable on said computer system, the software program configured to perform methods according to various embodiments described above.

The following detailed description and accompanying drawings provide a better understanding of the nature and advantages of the present invention.

DETAILED DESCRIPTION

Described herein are techniques for providing a computer-implemented vehicle application platform facilitating vehicle-to-business communications.

The apparatuses, methods, and techniques described below may be implemented as a computer program (software) executing on one or more computers. The computer program may further be stored on a computer readable medium. The computer readable medium may be non transitory, for example, and store instructions for performing the processes described below.

In the following description, for purposes of explanation, examples and specific details are set forth in order to provide a thorough understanding of various embodiments of the present invention. It will be evident, however, to one skilled in the art that the present invention as defined by the claims may include some or all of the features in these examples alone or in combination with other features described below, and may further include modifications and equivalents of the features and concepts described herein.

Figure 1:
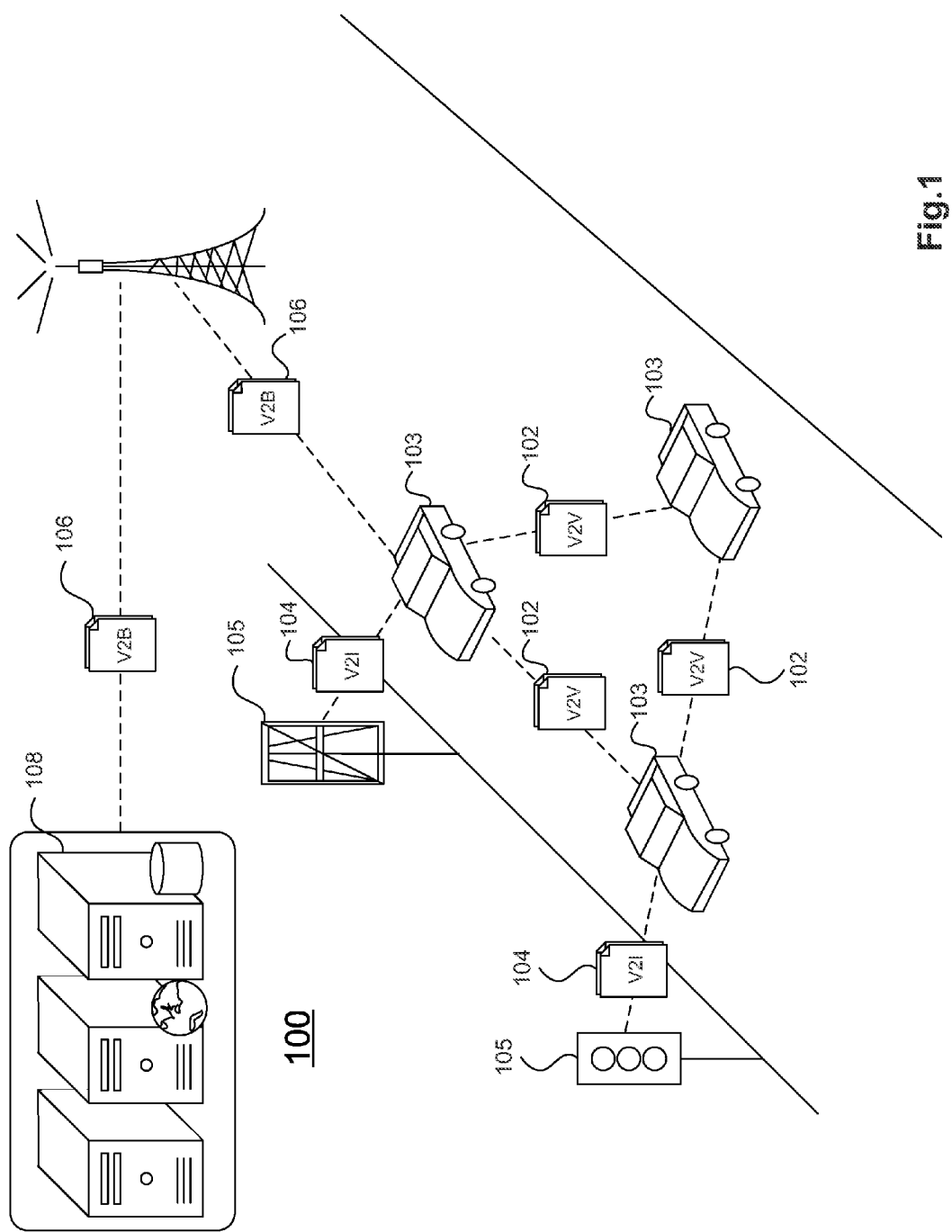
FIG. 1 shows a simplified view of an example of an Intelligent Transport System.
Figure 2:
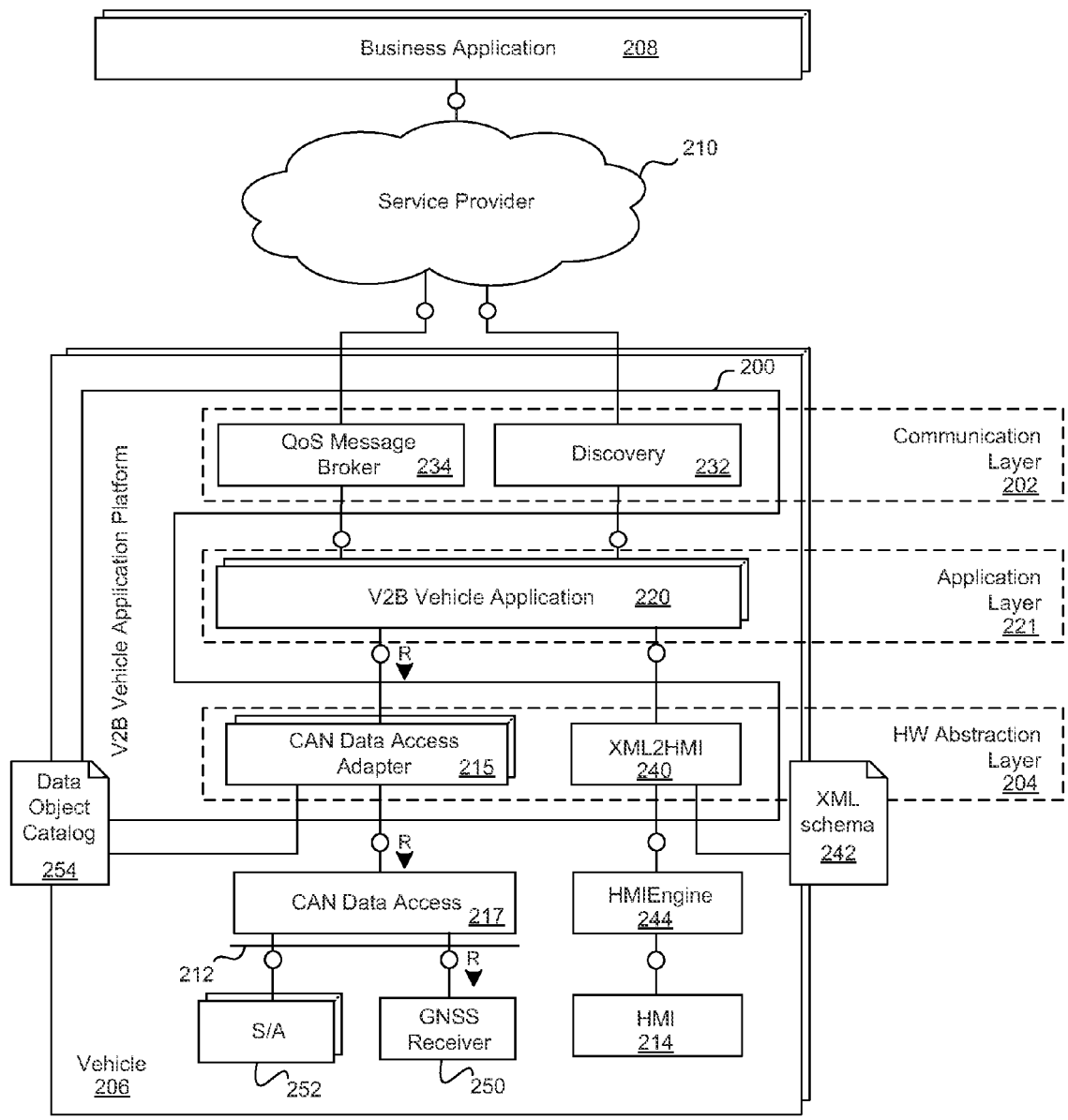
FIG. 2 depicts an embodiment of a Vehicle Application Platform.
Figure 2A:
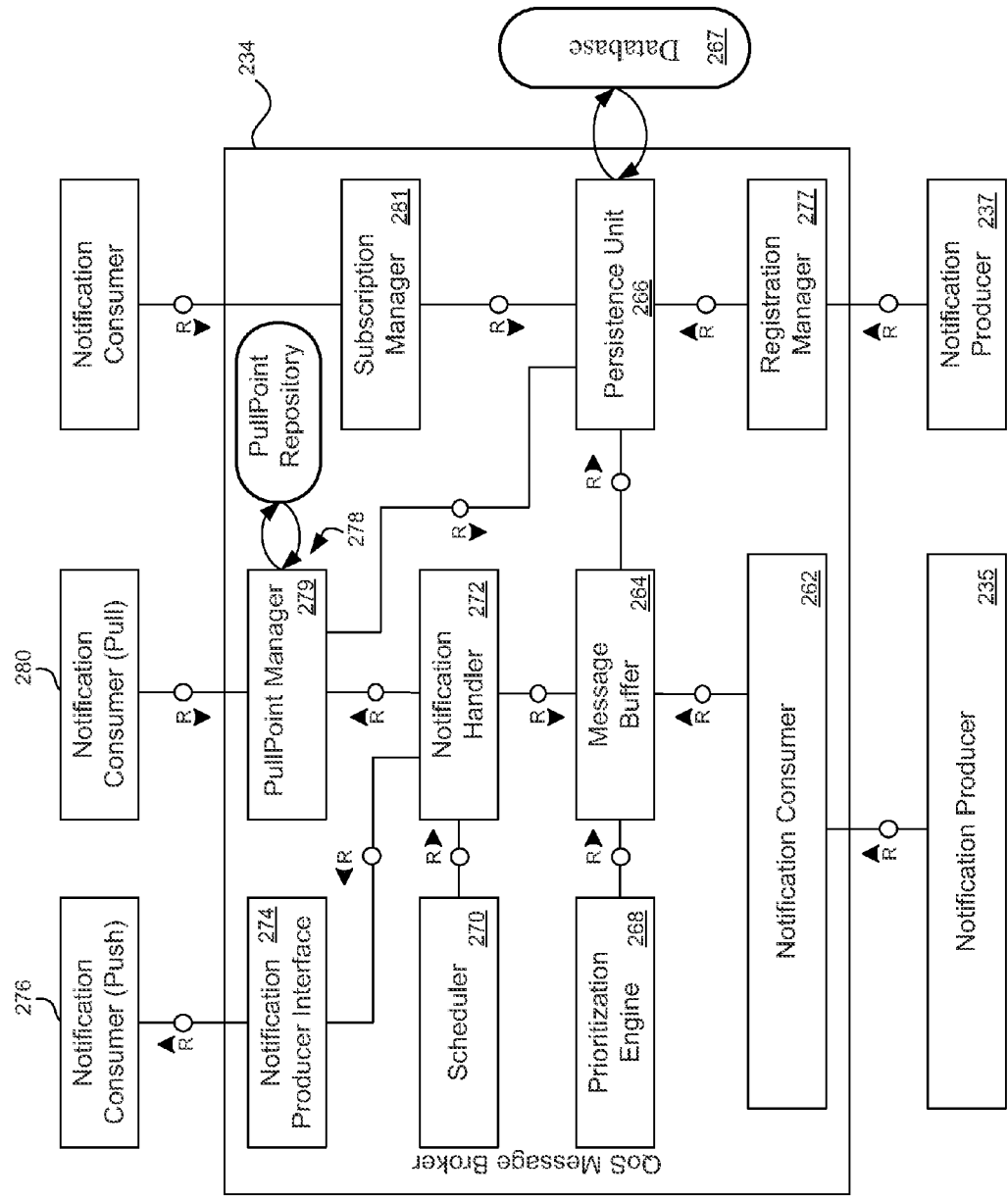
FIG. 2A depicts an embodiment of a message broker having QoS facilities.

Embodiments of the present invention relate to an in-vehicle platform tailored to the needs of V2B vehicle applications. As depicted in FIG. 2, the V2B Vehicle Application Platform (VAP) 200 serves as an interface between the V2B vehicle application 220 that is part of the application layer 221, the vehicle 206 and service provider 210. The VAP 200 comprises a communication layer 202 and a HW abstraction layer 204.

In certain embodiments the communication layer 202 is configured to facilitate reliable message exchange between vehicle 206 and business application 208 via dedicated service provider 210. In certain embodiments, the HW abstraction layer 204 is configured to encapsulate vehicle-specific interfaces, both with regard to the in-vehicle HMI 214 and the CAN bus 212. In this embodiment, GNSS receiver 250 and sensors and actuators (S/A) 252 are in communication with CAN bus 212.

The communication layer 202 and the HW abstraction layer 204 provide their functionality via open, non-proprietary, and well-defined interfaces. This allows for efficient development of V2B vehicle applications, and facilitates an enhanced portability of such V2B vehicle applications.

In the following discussion, it is understood that the exchange of information between V2B vehicle applications 220 and business applications 208 is handled by a service provider 210. In certain embodiments this service provider could be a third party service provider offering the service to connect vehicles to business applications. Alternatively, this service provider could be the operator of the business applications itself, who maintains an integration platform as part of its system landscape.

Embodiments of the present invention provide a standard-compliant VAP that facilitates service providers to integrate vehicles (i.e., by applying the standards). Thus, embodiments of the invention do not adapt the interface(s) provided by service providers, but instead propose an interface to be adapted by service providers.

Accordingly, in the following discussion of FIG. 2 the service provider(s) and their integration concepts are depicted as a black box, and are not described in more detail.

Additional discussion is available in Miche & Bohnert, "The Internet of Vehicles or the Second Generation of Telematic Services", *ERCIM News,* 77, 43-45 (2009), which is incorporated by reference in its entirety herein for all purposes.

VAP Communication Layer

Many integration architectures of the IoT apply the following architectural patterns to incorporate smart items into business processes: Service Oriented Architecture (SOA) and Event-Driven Architecture (EDA). Additional information is provided in the reference by de Souza et al. that is cited above.

In order to facilitate i) interconnection of vehicles, a specific class of smart items, and ii) existing IoT integration architectures of service providers, in certain embodiments the VAP communication layer 202 may adopt certain established standard techniques (such as WebService) to implement services, which are the basic elements of the SOA pattern. The open and standard-compliant interfaces of such Web Service-enabled vehicles, provide the basis for diverse application scenarios.

The communication layer 202 of the VAP 200 includes two Web Service communication modules: a discovery component 232, and a lightweight Quality of Service (QoS) message broker 234. The discovery module 232 addresses the intermittent connectivity of vehicles, and allows vehicles to register with service providers. The discovery module 232 provides an interface allowing V2B vehicle applications to register the service providers to which they intend to deliver messages.

The discovery module 232 supports a vehicle-triggered discovery. That is, vehicles announce their availability and register with the service providers defined in the locally deployed V2B vehicle applications.

The discovery component 232 is also able to listen to, and receive, multicast probe messages sent by service providers.

The lightweight QoS message broker 234 facilitates an asynchronous message exchange between vehicles and service providers according to the interaction style publish/subscribe (channel-based). The QoS message broker 234 serves as the vehicles' external interface for V2B communication, and encapsulates the deployed V2B vehicle applications.

The message broker 234 allows V2B vehicle applications, as well as service providers subscribing to specific channels, to publish and receive information about events of interest. Thus even where multiple V2B vehicle applications are interested in specific information, the respective message is delivered only once from the service provider to the vehicle, and distributed locally by the in-vehicle message broker. This benefits scalability of the V2B communication system as a whole, by reducing the number of messages exchanged between vehicles and service providers.

The basic publish/subscribe functionality is extended with QoS features to achieve a reliable information exchange despite the challenges of V2B communication. The QoS message broker 234 is able to buffer messages that cannot be delivered due to disconnections, and also to reschedule transmission of those messages.

The QoS message broker 234 may also comprise a prioritization facility, which allows assignment of priorities to messages. In certain embodiments, such prioritization could be based on specific certificates assigned to V2B vehicle applications by a dedicated institution.

The prioritization facility thus allows for a priority-based message delivery. This may be of particular importance if vehicles face periods of disconnections, or if only small-bandwidth communication technologies (e.g., GPRS) are available.

Moreover, the QoS message broker 234 may also facilitate the remote invocation of V2B vehicle applications. For this purpose the message header may be extended by a pre-defined set of metadata, to identify the V2B vehicle application and the respective method to be invoked. This permits broker 234 to distinguish between invocation requests, and pure information to be forwarded to a V2B vehicle application.

The QoS message broker 234 is also able to cope with the limited resources of OBUs, for example car PCs. To allow for various application scenarios, in certain embodiments the broker 234 provides an external Web Service interface according to a standard, extended by the aforementioned QoS features. An example is the OASIS standard WS-Notification as described by Huang & Gannon in "A Comparative Study of Web Services-based Event Notification Specifications", *ICPPW '06: Proceedings of the* 2006 *International Conference Workshops on Parallel Processing* (pp. 7-14). Washington, D.C. (2006), which is incorporated by reference in its entirety herein for all purposes. Also incorporated by reference herein for all purposes are the following documents: *Web Services Base Notification* 1.3 (*WS-BaseNotification*), OASIS Standard, 1 Oct. 2006; *Web Services Brokered Notification* 1.3 (*WS-BrokeredNotification*), OASIS Standard, 1 Oct. 2006; and *Web Services Topics* 1.3 (*WS-Topics*), OASIS Standard, 1 Oct. 2006.

According to the terminology of the Web Service Notification standard, the QoS message broker 234 can play the role of both notification consumer 262, 277 and notification producer 274, 279, 281 for receiving messages and delivering messages, respectively.

Messages received via the notification consumer interface 262 are buffered in the message buffer component 264. For each message, the message buffer component requests all notification consumers (i.e., vehicle applications or business applications) from the persistence unit component 266 that subscribed to the channel of the message.

In addition, the prioritization engine component 268 determines the priority of buffered messages. The prioritization engine component then orders the buffered messages in the queue of the message buffer component according to (i) their priority, and (ii) their notification consumer reference. This results in a priority-based FIFO queue, whereby messages with the same priority and notification consumer reference are ordered relatively to the first related entry in the queue.

Triggered by the scheduler component 270 (e.g., in fixed periods or in phases of dynamic length depending on the connectivity of the vehicle), the notification handler component 272 processes the buffered messages. The notification handler 272 requests the first message of the queue of the message buffer component, as well as messages with the same priority and notification consumer reference.

The notification handler component 272 aggregates the resulting set of messages. The notification handler either delivers this set of messages via the notification producer interface 274 to a related notification push consumer 276, or stores the set of messages in the pull point 278 of a pull consumer 280 subscribed to the given channel. In case of an abrupt disconnection, the messages are written back to the message buffer component 264.

Finally, buffered messages are persisted via the persistence unit component 266 in case the vehicle engine is shut down. Therefore, the persistence unit is in communication with a database 267.

A typical approach applied in the automotive industry is for in-vehicle communication to be realized via OSGi services.

This allows the idea of Web Service-enabled vehicles to be combined with a lightweight in-vehicle communication architecture.

Figure 2B:
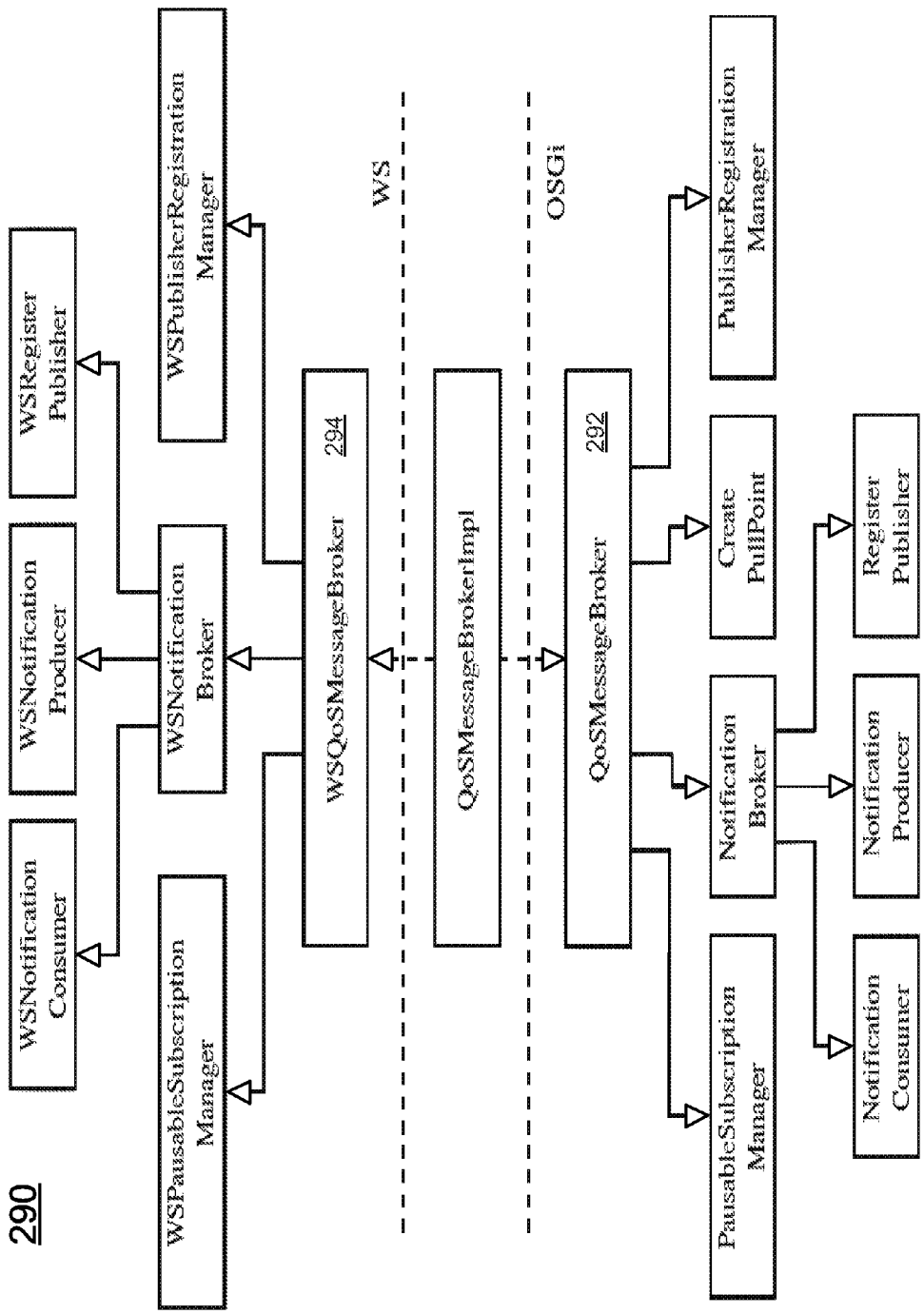
FIG. 2B depicts an embodiment of an interface of a message broker.
Figure 3A:
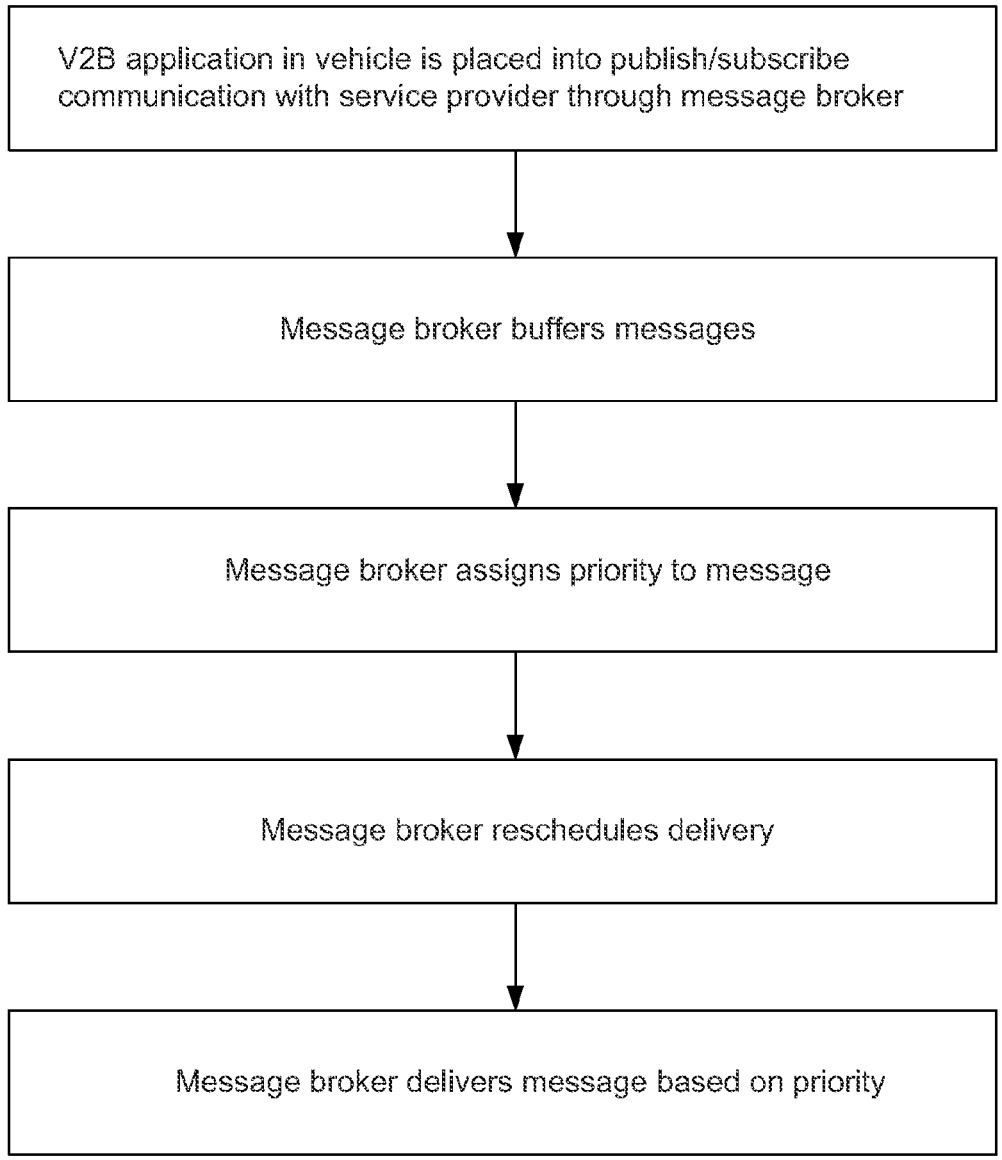
FIG. 3A depicts a flowchart of steps of operation of an embodiment of a message broker of a Vehicle Application Platform.

Due to the intermittent connectivity of vehicles, it may not be feasible for business applications to subscribe to specific channels as notification pull consumers. Instead, in certain embodiments the message broker communicates messages to the service provider for delivery to subscribed Web Service-enabled business application as soon as a connection is established. This is reflected in the overview of the interface 290 of the QoS message broker 234 depicted in FIG. 2B. FIG. 3A depicts a flowchart of steps of operation of an embodiment of a message broker of a Vehicle Application Platform.

In this embodiment, while the OSGi interface (QoSMessageBroker 292) of the QoS message broker allows vehicle applications to play the role of both notification push and notification pull consumers, the Web Service interface (WSQoSMessageBroker 294) only provides push-delivery functionality. Consequently, the Web Service interface of the QoS message broker does not include the CreatePullPoint interface of the OASIS Web Service Notification standard.

The level of security and privacy may be dependent upon the particular application scenario. For example, a maintenance application of a vehicle manufacturer (which collects and delivers system information of a vehicle such as engine details or the current oil level), requires a higher level of security compared to a telematic service that provides location-based advertisements.

Accordingly, in certain embodiments the VAP may not provide any specific default security functionality. However, the VAP may support incorporation of security mechanisms such as message encryption, identity management, or access control, that are tailored to the application-specific security needs.

For example, the OASIS standard WS-Security extends the SOAP message header by security features, thereby allowing for end-to-end security in Web Service communication. Incorporated by reference herein for all purposes is *Web Services Security: SOAP Message Security* 1.1 (*WS-Security* 2004), Oasis Standard Specification (1 Feb. 2006). This encompasses data integrity and confidentiality, as well as the integration of encryption information into SOAP messages.

It is noted that a number of message brokers exist to facilitate an asynchronous information exchange according to the interaction style publish/subscribe. Of these, JBoss HornetQ, SwiftMQ, or RabbitMQ provide QoS aspects, but do not support message exchange according to the OASIS standard WS-Notification.

Other known message brokers (such as Apache ActiveMQ, the related service bus ServiceMix, or Fuse Message Broker) feature interfaces that are WS-Notification compliant. However, they do not include a priority-based processing of messages, nor do they cope with resource restrictions of OBUs.

Even though the WS4D stack (an implementation of the OASIS standard DPWS) allows for Web Service operations on resource-constrained devices, it only features the standard WS-Eventing, which is described by Jammes et al in "Service-oriented device communications using the devices profile for web services", *MPAC '05: Proceedings of the 3rd international workshop in Middleware for pervasive and ad-hoc computing*, ACM, pp. 1-8 (2005) and incorporated by reference in its entirety herein. The WS-Eventing standard is available at http://www.w3.org/Submission/WS-Eventing/, which is hereby incorporated by reference for all purposes. Consequently, as described by Huang & Gannon as cited above, it does not provide the functionality of a channel-based publish/subscribe message broker.

Eventually, the lightweight communication middleware Mundocore may facilitate channel-based publish/subscribe interaction for smart items. This is described by Aitenbichler et al. in "Mudocore: A light-weight infrastructure for pervasive computing", *Pervasive and Mobile Computing*, Vol. 3, pp. 332-361 (2007), which is incorporated by reference in its entirety herein for all purposes. However, Mundocore neither includes priority management nor complies it with the standard WS-Notification.

Thus existing known message brokers do not appear to be comparable with the proposed messaging component of the VAP, which provides a lightweight application and adaptation of the WS-Notification standard and accounts for the specific challenges of V2B communication by dedicated buffering, prioritization, and scheduling mechanisms.

VAP HW Abstraction Layer

The HW abstraction layer 204 of the VAP 200 encapsulates the vehicle-specific interfaces of the CAN bus 212 and the in-vehicle HMI 214. In this manner, access to vehicle data, as well as display of information to passengers, can be provided by V2B vehicle applications in a well-defined way, independent of the underlying technologies.

In certain embodiments the CAN data access adapter 215 is a vehicle-specific module. That is, the CAN data access adapter 215 is specific to an instance of the CAN data access component 217.

The CAN data access adapter 215 complies with the design pattern "Adapter", and can be plugged into the VAP. It facilitates a well-defined access to CAN data objects of different vehicle manufacturers/product lines, by providing a well-defined and semantically annotated catalog 254 of data objects that can be read from CAN buses. This concept allows vehicle manufacturers to provide respective adapters (i.e., specific instances of the CAN data access adapter) that implement the interface defined by the VAP.

Respective adapters provided by vehicle manufacturers may also implement the interface to their existing (proprietary) CAN data access components, for example the vehicle API. Additional information is described by Liibke in "Car-to-Car Communication—Technologische Herausforderungen", *Kongressband zum VDE-Kongress* 2004-*Innovationen* (2004), which is incorporated by reference in its entirety herein for all purposes.

Again, the particular security mechanisms related to the vehicle data access can depend on the application scenarios. Accordingly, certain embodiments of the VAP may not provide a default configuration.

Where a vehicle manufacturer intended to allow only limited access to vehicle data, it could simply limit the mapping of its CAN data access adapter 215. Otherwise, dedicated security components (for example identity management and access control functionality) could be used to control the access to vehicle data.

The HW abstraction layer further provides a generic interface to the in-vehicle HMI. In particular, the component XML2HMI 240 of HW abstraction layer 204, adopts proven concepts for abstract user interface description (such as Qt, swiXML, or XUL). This allows vehicle manufacturers to optimize the user interface with respect to the capabilities of their HMIs (such as input modality and screen resolution).

The defined XML schema 242 may be limited to elements to be displayed (such as label, input field), related actions, and input required from the user (such as String, int). Moreover, the defined XML schema 242 may include specified identifiers for system graphics and system sounds provided by the in-vehicle HMI 214. The XML schema 242 may further allow V2B vehicle applications to refer to specific graphics, for example the logo of the company providing the services (e.g., the logo of the insurance company in the Example #1 provided below).

Figure 3B:
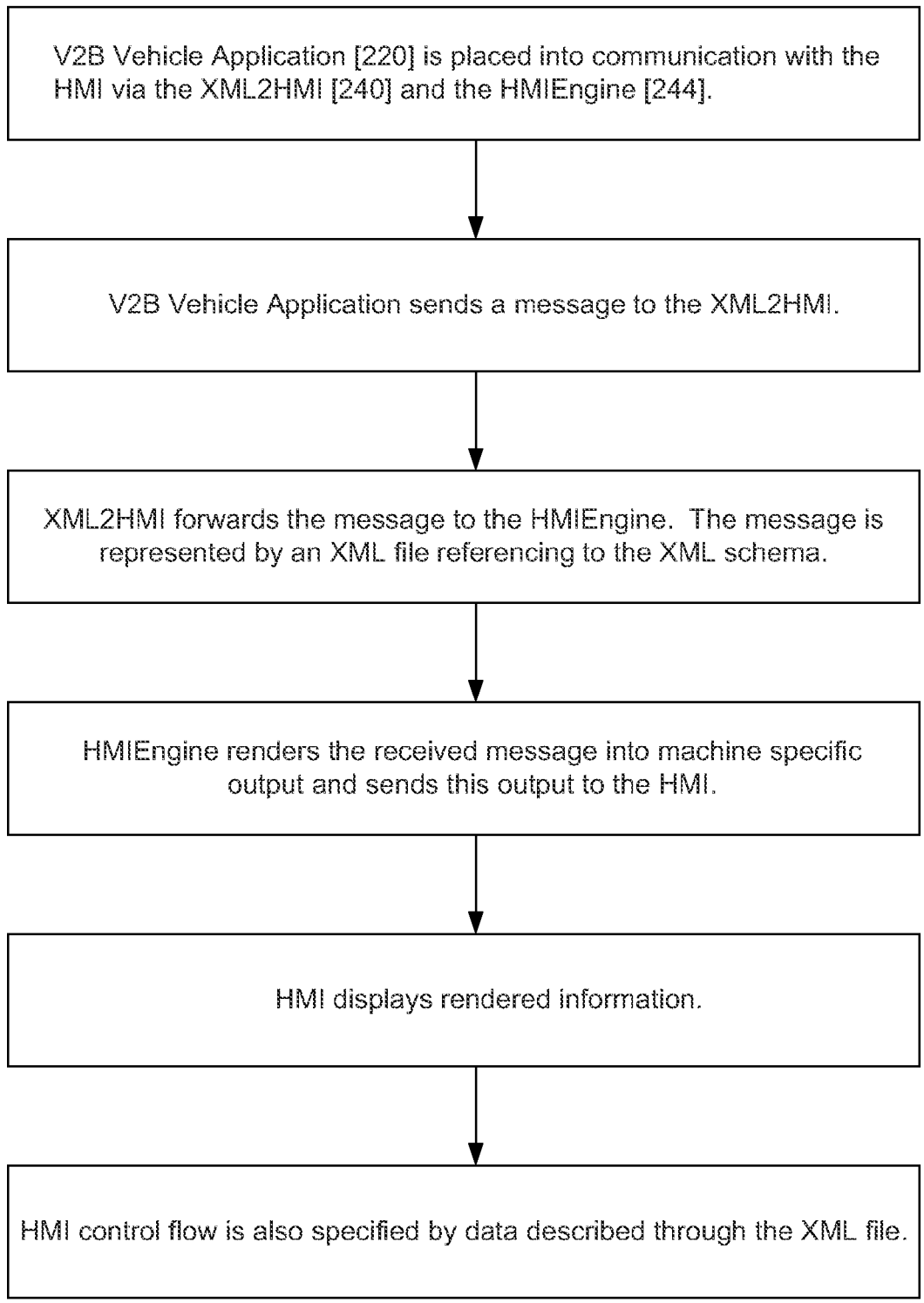
FIG. 3B depicts a flowchart of steps of operation of an embodiment of an XML component of a Vehicle Application Platform.

The defined XML schema 242 may encompass certain metadata attributes. These metadata attributes may facilitate the specification of the control flow of a user interface with multiple screens, and/or the configuration of the priority of an application. Similar to the message prioritization provided by the message broker 234, this priority could be determined by an independent organization. FIG. 3B depicts a flowchart of steps of operation of an embodiment of an XML component of a Vehicle Application Platform.

Actual interpretation of the XML file, and rendering of the user interface, are covered by an instance of the HMI-specific HMI engine 244 provided by the vehicle manufacturer. This decoupling of function permits a standardized access to in-vehicle HMIs, across the boundaries of a single vehicle manufacturer. The decoupling of function also allows vehicle manufacturers to optimize the user interface by taking into consideration the capabilities of their HMIs, such as input modalities or the resolution of the screen.

Furthermore, vehicle manufacturers can apply their corporate design to the user interface, and provide passengers with a consistent look-and-feel. Thus according to certain embodiments, the proposed component XML2HMI 240 may not support templates provided by V2B vehicle applications, as this could affect the adaptability of the user interface.

Figure 4:
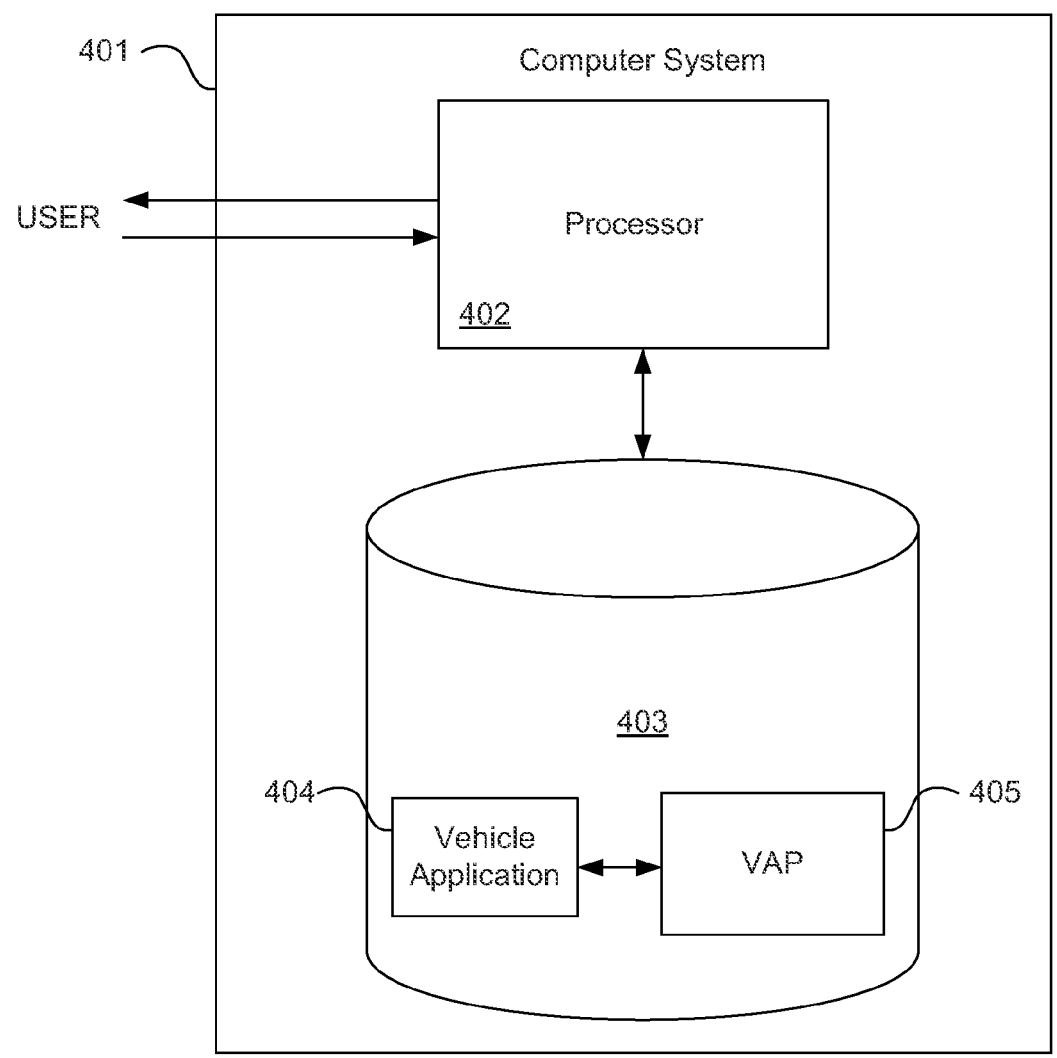
FIG. 4 shows a computer system for implementing a vehicle application platform (VAP) according to one embodiment.

FIG. 4 illustrates hardware of a special purpose computing machine configured to implement a VAP according to one embodiment of the present invention. In particular, computer system 401 comprises a processor 402 that is in electronic communication with a computer-readable storage medium 403 that can comprise V2B vehicle applications 404 and the VAP 405. As it is expected that the computer system should fit into a car, its components may be compact and include only essential functionality.

The computer system may comprise a software server. A number of software servers together may form a cluster, or logical network of computer systems programmed with software programs that communicate with each other and work together to process requests.

Figure 5:
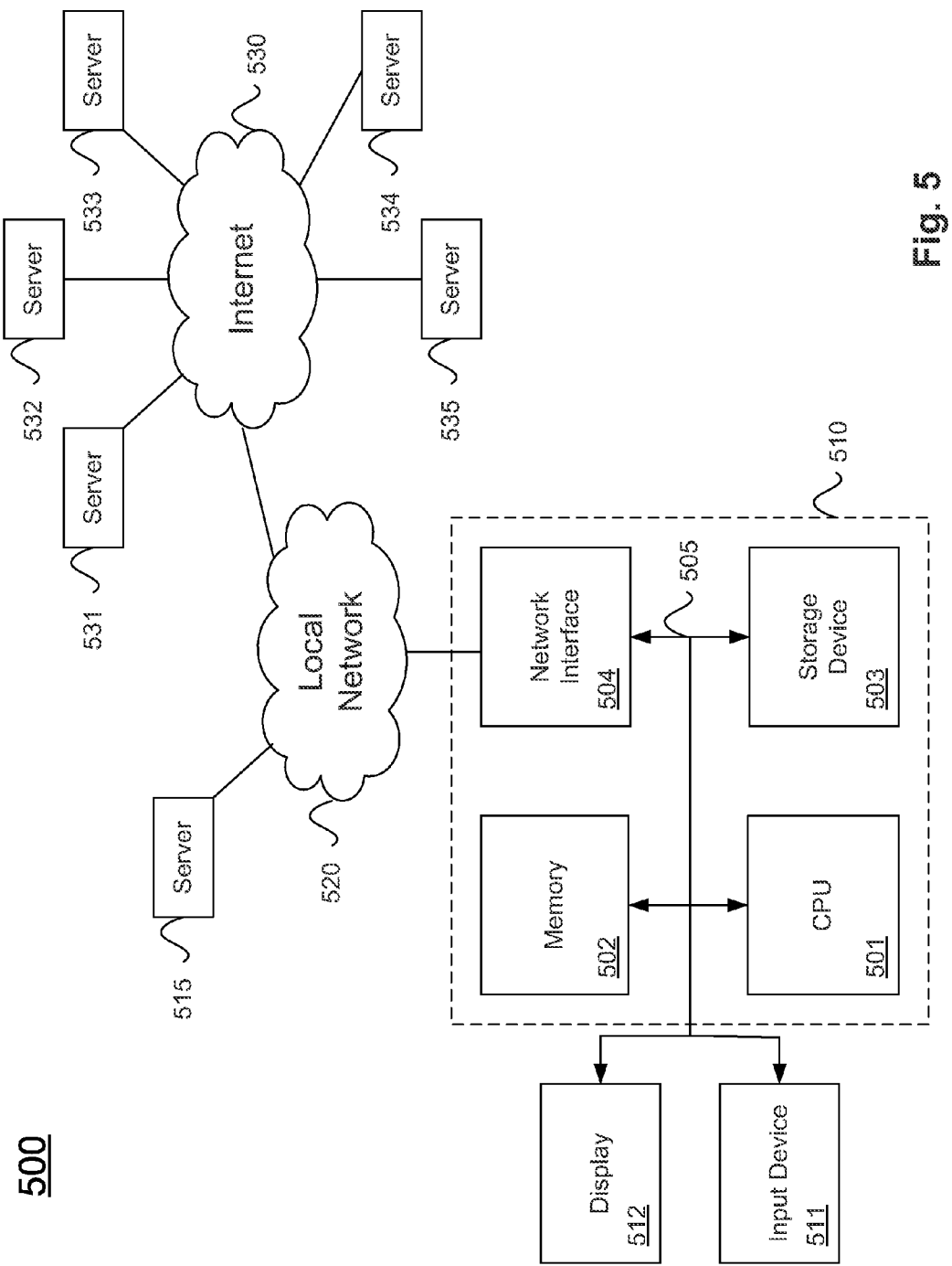
FIG. 5 illustrates hardware of a special purpose computing machine configured with a vehicle application platform according to one embodiment of the present invention.

An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both.

A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable media. The computer system generally described in FIG. 5 includes at least those attributes described in FIG. 4.

Computer system 510 may be coupled via bus 505 to a display 512, such as a cathode ray tube (CRT) or liquid crystal display (LCD), for displaying information to a computer user. An input device 511 such as an in-vehicle touch screen, is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be for Broadband Wireless Access (BWA) technologies, such as UMTS/HSPA, WiMAX, or LTE. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein.

In certain embodiments, the clients or computers may be represented by on-board processor units present in an automobile. Servers may be represented by services providers (for example the service provider 210 in FIG. 2), which function as mediators to connect the different vehicles with business applications.

In an example involving the Internet, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

EXAMPLE #1

An example is now provided in connection with an insurance company offering a V2B vehicle application complementary to its business applications, and which allows for integration of vehicle data into claims assistance processes. Such a V2B application could also improve the claims assistance process, as described by Baecker et al. in "Vehicle-to-Business Communication The Example of Claims Assistance in Motor Insurance", *MKW* 2010-*Automotive Services* 2010 (AS 2010) 1-12 (2010), which is incorporated by reference herein for all purposes. Such a V2B application could also improve the claims management process, as described by Baecker et al. in "Mobile First Notice of Loss: Claim Assistance in your Pocket", *Proc. of the 7th International Conference on Pervasive Computing*, Vienna, Austria, pp. 279-282. (2009), which is incorporated by reference in its entirety herein for all purposes. Moreover, certain insurance models are based on V2B, for example the pay-as-you-drive plan described by Ott et al., "Erhöhte Sehschärfe—Technologiebasierte Innovationen in der Versicherungswirtschaft: Bedeutung, Chancen and Herausforderungen", *Accenture Studie* (2008), which is also incorporated by reference in its entirety herein for all purposes.

The prospective value of such approaches could be reduced if the insurance company had to provide a dedicated version of their V2B vehicle application for each vehicle type. However, equipping the insured vehicle with a VAP according to an embodiment of the present invention, would considerably simplify the development of the V2B-based insurance model. Specifically, by offering V2B vehicle applications for integrating vehicle data into its business processes, the insurer is able to focus its development effort on the actual business and application logic, without being distracted by the various challenges of V2B communication described above.

As an additional note, the XML schema 242 of the XML2HMI component 240 of the HW abstraction layer 204, may further allow V2B vehicle applications to refer to specific graphics. This would facilitate display of the logo of the insurance company.

EXAMPLE #2

Figure 6:
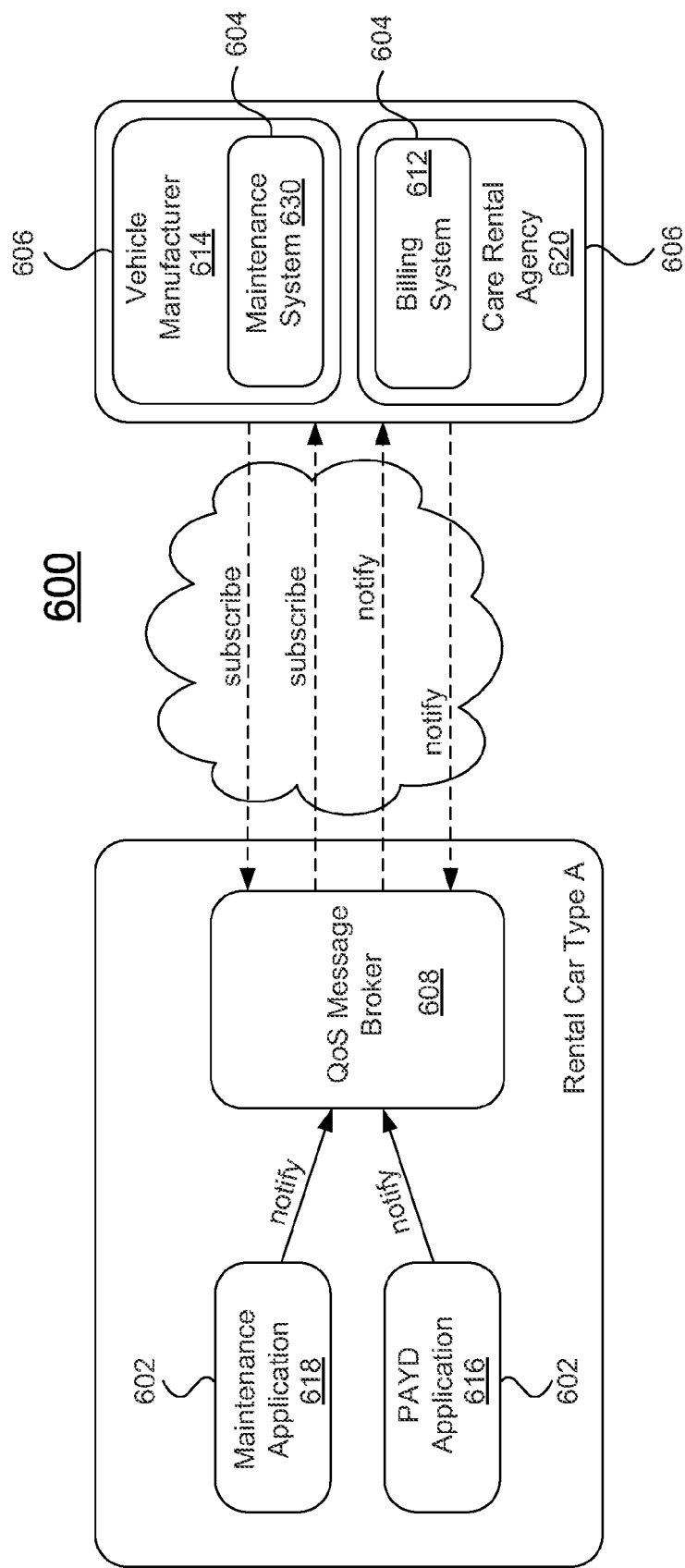
FIG. 6 illustrates an example of operation of a message broker.

Another example is now provided describing the QoS message broker, and in particular focusing upon its buffering and prioritization functionality. An overview of the entities of the application scenario is presented in FIG. 6.

The application scenario 600 includes vehicle applications 602, business applications 604 of different services providers 606, and the QoS message broker 608. In addition, the scenario 600 illustrates the communication between these entities according to the publish/subscribe interaction model.

The car rental agency 620 uses a Pay-As-You-Drive (PAYD) billing model. Thus, the driver pays for every driven kilometer, and gets a special discount for using only specific road types such as federal highways instead of highways.

In addition, the pricing depends on the renter's driving behavior. The price increases when driving in a risky manner, or driving too fast. To ensure appropriate billing, a PAYD application 616 in the vehicle sends information about its position and the driving behavior to the billing system 612 of the car rental agency 620 at an interval of five seconds.

Furthermore, a vehicle maintenance application 618 of the vehicle manufacturer 614 sends system information such as oil level, engine speed, or brake shoe status, at an interval of five seconds to a maintenance system 630 of the vehicle manufacturer.

In the scenario, a rental car 610 of type "A" is driving in an area without reception such as a tunnel, beginning at a time t0 and ending at a time t1. Between time t1 and t2, there is a short area with signal. After time t2, the car loses connection again.

During the period of disconnection between the times t0 and t1, the QoS message broker buffers all messages to prevent them from being lost. Suddenly, the oil level of the vehicle engine exceeds a critical threshold.

Being more important than PAYD messages, this critical oil level warning message is tagged with high priority. After reestablishing the connection (after t1), the QoS message broker delivers all messages to the respective business applications according to their priority. Messages with a high priority are sent first.

The maintenance system of the vehicle manufacturer detects that other vehicles of type "A" had an engine breakdown within the next two kilometers after the oil warning occurred. This information needs to be delivered to the rental car before t2 in order to enable the driver to stop the car in time.

To evaluate the QoS features of the proposed QoS message broker, a simulation model has been defined. This model comprises the QoS message broker and the four entities illustrated in FIG. 6, and reflects the application scenario describe above.

Using a publish/subscribe-based message exchange, the QoS message broker and the two business applications of the car rental agency and the vehicle manufacturer subscribe to each other in the first phase. Afterwards, the vehicle applications (i.e., maintenance application and PAYD application) start sending messages to the QoS message broker, which delivers them to the corresponding business applications.

At t0, the QoS message broker loses connectivity. The QoS message broker buffers all messages to be delivered to the two business applications. The messages are ordered according to their priority.

After another 60 seconds, the QoS message broker receives the critical oil level warning message. With the reestablishment of the connection at t1, the QoS message broker delivers all buffered messages according to their priority, sending the critical oil level warning message first. Having received this high-priority message, the vehicle manufacturer's maintenance system returns the engine breakdown warning message back to the QoS message broker.

The time needed to deliver a message from the in-vehicle QoS message broker to the maintenance system can be approximated assuming a message size of 1434 Bytes and a small bandwidth of 8 kbps (e.g., GPRS):

$$1434 \text{ Bytes} \approx 1.4 \text{ kByte}, 8 \text{ kbps} = 1 \text{ kBps}$$

$$1.4 \text{ kByte}/1 \text{ kBps} \approx 1.4 \text{ s}$$

Message delivery without prioritization would significantly delay the transmission of the critical oil level warning message. Since both vehicle applications send messages at an interval of five seconds, the QoS message broker buffers twenty-four messages in the disconnection phase of sixty seconds. Taking up the approximated delivery time of 1.4 seconds per message, the transmission of twenty-four messages would delay the transmission of the critical oil level warning message by thirty-three seconds.

Driving at a speed of 80 km/h, the vehicle would pass more than 734 meters in 33 seconds, and could reach the next no-signal area without having transmitted the critical oil level message. Under these circumstances, the vehicle could reach the next no-signal area without having received the respective engine breakdown warning message from the vehicle manufacturer's maintenance system. This would increase the risk of an engine breakdown that is likely to occur within two kilometers after the oil level of the car engine has exceeded the critical threshold.

This situation represents a typical application scenario for V2B communication and demonstrates the necessity of the QoS functionality provided by the proposed in-vehicle QoS message broker. A non-prioritized message delivery would likely result in an engine breakdown. Without the buffering mechanism, the probability of the engine breakdown would further increase, because the critical oil level warning message would be lost in the period of disconnection between t0 and t1.

In summary, various embodiments of the present invention may offer certain benefits. For example, by providing both a communication layer and a HW abstraction layer, an embodiment of a VAP may provide a comprehensive set of communication facilities and encapsulates a variety of vehicle-specific interfaces.

Embodiments of the VAP may provide all functionality required to implement V2B vehicle applications. An embodiment of a VAP according to the present invention may account for the challenges of V2B communication, and may allow deployment of V2B vehicle applications on different vehicles without requiring substantial adaptation.

In certain embodiments, the Web Service standard-compliant interfaces of the communication layer facilitate integration of vehicle data into business processes. Consequently, embodiments of a VAP may lower the barrier for entry into the V2B market. Implementation of embodiments of a VAP may allow the potential of V2B communication to be realized, both with regard to the opportunity of novel business models, and also to foster the introduction of V2V and V2I technologies.

Based on use of open and standard-compliant Web Service interfaces, embodiments of a VAP according to the present invention may facilitate and ease the interconnection of vehicles with mature integration platforms. An example of such an integration platform is the SOCRADES platform developed within the EU-funded research project SOCRADES.

For example, one embodiment of the VAP could be employed to deliver vehicle data to SAP's NetWeaver Business Warehouse. This would allow the analysis of mass data provided by vehicles, and provide the basis for various business intelligence applications.

In summary, embodiments of a VAP according to the present invention allow for interconnecting existing business applications with diverse vehicles, despite their deviating interfaces and HW components. Hence, such a VAP may provide the basis for an end-to-end solution for business telematic services offered by business application providers.

Embodiments of a VAP described herein may differ in certain ways from ongoing efforts in the field of vehicle communications. For example, some current ITS research projects focus on road safety and traffic efficiency enabled by V2V and V2I communication. Examples of such research include Co-operative Systems for Intelligent Road Safety (COOPERS), SAFESPOT, PReVent, and IWay. Such in-vehicle concepts do not support, and hence do not address, challenges facing V2B communication.

The European research projects CVIS and GST do appear to relate to both the interconnection of vehicles and business applications, and a required in-vehicle platform. In particular, CVIS and GST propose in-vehicle concepts for V2B communication that comprise messaging components, as well as the access to vehicle data and the in-vehicle HMI. GST is discussed by Gustafson et al. in *GST Open Systems Architecture and Interface Specification* (2005), retrieved from http://www.gstforum.org/download/SP level deliverables/Open Systems/DEL_OS_DEV_3_1 Architecture_and_interface_specifications_v1.1.pdf, and incorporated by reference in its entirety herein for all purposes. Also incorporated by reference herein for all purposes is Solberg et al., *Architecture and System Specifications* (2007), retrieved from http://www.cvisproject.org/download/Deliverables/DEL_CVIS_3.3_Architecture_and_System_Specifications_v1.2.pdf.

Both CVIS and GST facilitate the exchange of SOAP messages between vehicles and service providers, and support a priority management mechanism that allows for assigning priorities to messages. This affects not only the order in which messages are delivered, but also the selection of appropriate wireless communication technologies (e.g., GPRS, Wi-Fi). However, the message component does not provide any buffering features. Rather, both buffering and rescheduling is delegated to, and has to be covered by, V2B vehicle applications.

Both CVIS and GST also provide a comprehensive concept for accessing vehicle data. By contrast, the VAP is not intended to comprise an all-embracing vehicle data access mechanism. Rather, the VAP accounts for different interfaces to vehicle data provided by different vehicle manufacturers (for example the Volkswagen VAPI which is also part of the Intellidrive architecture), as well as the related semantics.

With regard to the HMI access, both CVIS and GST apply the mechanisms developed in the research project AIDE. AIDE allows for displaying adaptive user interfaces on the in-vehicle HMI.

However, AIDE focuses on realizing "I/O management of interfering output events and adapt driver system interaction to the driver status and preferences as well to the driving situation" as described by Kussmann et al. in "System Architecture, data flow protocol definition and design and AIDE specifications" (2004), retrieved from http://www.aide-eu.org/pdf/sp3_deliv_new/aide_d3_2_2_summary.pdf., 2004) and incorporated by reference in its entirety herein for all purposes.

Furthermore, AIDE requires V2B vehicle applications to integrate the defined AIDE interface adapter. In contrast, the abstract user interface description of the proposed XML2HMI component 240, adopts well-known and proven concepts, which are for example applied by Qt, swiXML, or XUL. The VAP enforces decoupling of V2B vehicle application and the in-vehicle HMI. This is done by introducing a programming-language independent XML-based HMI access. Further information is available in Stuart et al., "Integration of Nomadic Devices: The AIDE Use Case" (2004), retrieved from http://www.aide-eu.org/pdf/sp3_deliv_new/aide_d3_4_3.pdf.2004 and incorporated by reference in its entirety herein for all purposes.

For this reason, AIDE represents a complementary approach that could be combined with the proposed XML2HMI component.

While some known ongoing work comprises comprehensive in-vehicle integration concepts with regard to the access to vehicle data and the HMI, the important issues of varying interfaces provided by different vehicle manufactures and product lines, is not addressed. The vehicle data and HMI access specified in CVIS and GST can be seen as complementary approaches of the respective components (CAN data access adapter, XML2HMI) of the VAP.

In another approach adopted by the Intellidrive research project, various applications make use of a so called HMI Service component in order to display information on the in-vehicle HMI. This enables V2B vehicle applications to specify graphic elements by pre-defined identifiers and to define text to be displayed.

The HMI Service component builds the screen by getting the corresponding graphic files and the referred layout template out of a container provided by the V2B vehicle application. This is described by Andrews & Cops, "Final Report: Vehicle Infrastructure Integration Proof of Concept Technical Description-Vehicle", Novi, M I (2009), retrieved from http://www.intellidriveusa.org/documents/052009-TechnicalDescription.pdf and incorporated by reference in its entirety herein for all purposes. As a result, the look-and-feel of the presentation is application-specific, and the user interface cannot be adapted to available input modalities of the in-vehicle HMI.

By contrast, using the XML2HMI mechanism according to embodiments of the present invention, applications need not provide additional data. Rather, due to the clear separation of the interface (XML2HMI) and the rendering engine (HMI engine), the required display information (such as system graphics, system sounds, or—if appropriate—templates), are provided by the HMI-specific HMI engine.

This HMI engine is provided by the OEM and tailored to the properties and capabilities of the HMI. This allows OEMs to furnish a consistent look-and-feel. Application developers are independent of visualization aspects, by only providing an abstract definition of the information to be displayed.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising operating a computer in a vehicle to perform steps of:
   providing a vehicle application platform (VAP) to facilitate communication between a vehicle-to-business software application executing on the computer and business applications executing on a server system separate from the vehicle;
   supporting on the VAP execution of a discovery process including the discovery process detecting a network connection and in response thereto registering the vehicle with a service provider associated with the vehicle-to-business software application; and
   supporting on the VAP execution of a message broker including the message broker:
      managing transmission of messages from the vehicle-to-business software application to the service provider; and
      detecting failure in delivery of a message to the service provider and, in response thereto, buffering said message and scheduling said message for subsequent transmission of said message to the service provider.

2. The method of claim 1 further comprising causing the message broker to assign a priority to messages to the service provider.

3. The method of claim 2 wherein the assignment of the priority is based upon a certificate assigned to the vehicle-to-business software application.

4. The method of claim 2 further comprising causing the message broker to deliver messages to a business application based upon the assigned priority.

5. The method of claim 1 further comprising causing the message broker to invoke the vehicle-to-business software application based upon a message header extended by a pre-defined set of metadata.

6. The method of claim 1 further comprising:
   placing the vehicle-to-business software application into communication with a human machine interface of the vehicle, through an XML-based bi-directional interface provided by the vehicle application platform; and
   causing the XML-based bi-directional interface to reference a defined XML schema comprising, elements to be displayed, related actions, or input required from a user of the vehicle.

7. A non-transitory computer readable storage medium embodying a computer program for performing a method, said method comprising:
   providing a vehicle application platform (VAP) to facilitate communication between a vehicle-to-business software application executing on the computer and business applications executing on a server system separate from the vehicle;
   supporting on the VAP execution of a discovery process including the discovery process detecting a network connection and in response thereto registering the vehicle with a service provider associated with the vehicle-to-business software application; and
   supporting on the VAP execution of a message broker including the message broker:
      managing transmission of messages from the vehicle-to-business software application to the service provider; and
      detecting failure in delivery of a message to the service provider and, in response thereto, buffering said message and scheduling said message for subsequent transmission of said message to the service provider.

8. The computer readable storage medium of claim 7 wherein the method further comprises causing the message broker to assign a priority to messages to the service provider.

9. The computer readable storage medium of claim 8 wherein the assignment of the priority is based upon a certificate assigned to the vehicle-to-business software application.

10. The computer readable storage medium of claim 8 wherein the method further comprises causing the message broker to deliver messages to a business application based upon the assigned priority.

11. The computer readable storage medium of claim 7 wherein the method further comprises causing the message broker to invoke the vehicle-to-business software application based upon a message header extended by a pre-defined set of metadata.

12. The computer readable storage medium of claim 7 wherein the method further comprises:
   placing the vehicle-to-business software application into communication with a human machine interface of the vehicle, through an XML-based bi-directional interface provided by the vehicle application platform; and
   causing the XML-based bi-directional interface to reference a defined XML schema comprising, elements to be displayed, related actions, or input required from a user of the vehicle.

13. A computer system comprising:
   one or more processors;
   a software program, executable on said computer system, the software program configured to:
   provide a vehicle application platform (VAP) to facilitate communication between a vehicle-to-business software application executing on the computer and business applications executing on a server system separate from the vehicle;
   support on the VAP execution of a discovery process including the discovery process detecting a network connection and in response thereto registering the vehicle with a service provider associated with the vehicle-to-business software application; and
   support on the VAP execution of a message broker including the message broker:
      managing transmission of messages from the vehicle-to-business software application to the service provider; and detecting failure in delivery of a message to the service provider and, in response thereto, buffering said message and scheduling said message for subsequent transmission of said message to the service provider.

14. The computer system of claim 13 wherein the software program is further configured to cause the message broker to assign a priority to messages to the service provider.

15. The computer system of claim 14 wherein the assignment of the priority is based upon a certificate assigned to the vehicle-to-business software application.

16. The computer system of claim 14 wherein the software program is further configured to cause the message broker to deliver messages to a business application based upon the assigned priority.

17. The computer system of claim 13 wherein the software program is further configured to cause the message broker to invoke the vehicle-to-business software application based upon a message header extended by a pre-defined set of metadata.

* * * * *